United States Patent [19]

Meyer et al.

[11] Patent Number: 4,707,921
[45] Date of Patent: Nov. 24, 1987

[54] EXTENSION HANDLE FOR A HANDHELD ELECTRICALLY POWERED TOOL

[75] Inventors: Burton C. Meyer, Downers Grove; Fritz Fauser, Arlington Heights, both of Ill.

[73] Assignee: Marvin Glass & Associates, Chicago, Ill.

[21] Appl. No.: 892,297

[22] Filed: Aug. 4, 1986

[51] Int. Cl.⁴ .......................................... B26B 27/00
[52] U.S. Cl. .............................. 30/296 R; 16/114 R; 30/231; 30/DIG. 5; 173/170
[58] Field of Search ............... 30/231, 290, 296 R, 30/194, DIG. 5, 122; 16/110 R, 111 R, 114 R, DIG. 24; 173/170

[56] References Cited

U.S. PATENT DOCUMENTS 3,949,817  4/1976  Rice .................................. 30/296 R Primary Examiner—Douglas D. Watts
Attorney, Agent, or Firm—John S. Pococha

[57] ABSTRACT

An extension handle facilitating use of a handheld electrically driven grass shear from an upright standing position that removably attaches to the hand grippable portion of the grass shear by depending pairs of opposed, resilient, inwardly biased clamps. A flexible strip extends through the extension handle for remote control of the grass shear on/off controls from the hand gripped section of the extension handle. The flexible strip includes a depending cam for laterally moving an on/off slide lock switch. Inwardly directed guide posts within the extension handle direct movement of the flexible strip substantially in the direction necessary to actuate the controls on the grass shear.

12 Claims, 5 Drawing Figures

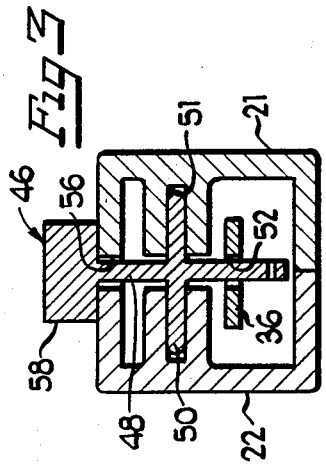
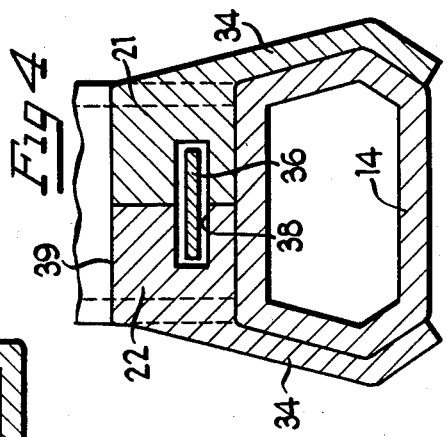
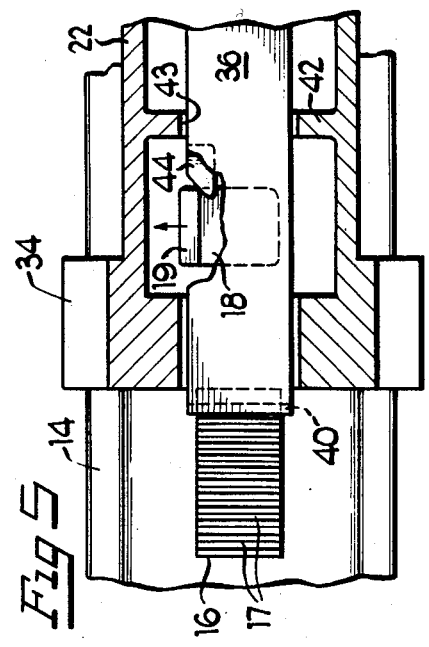
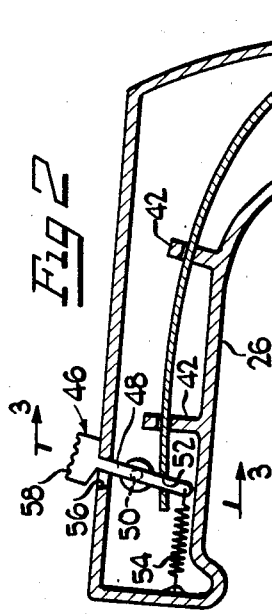
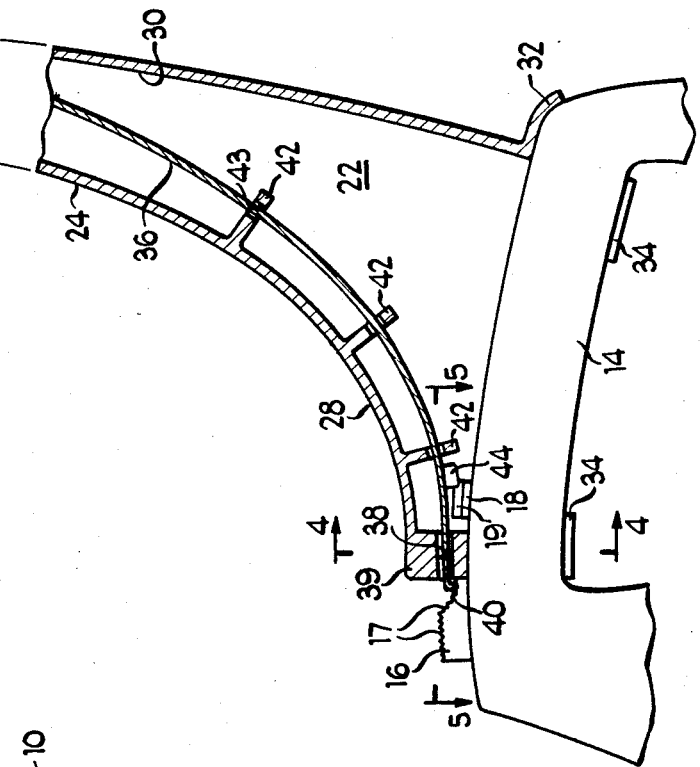
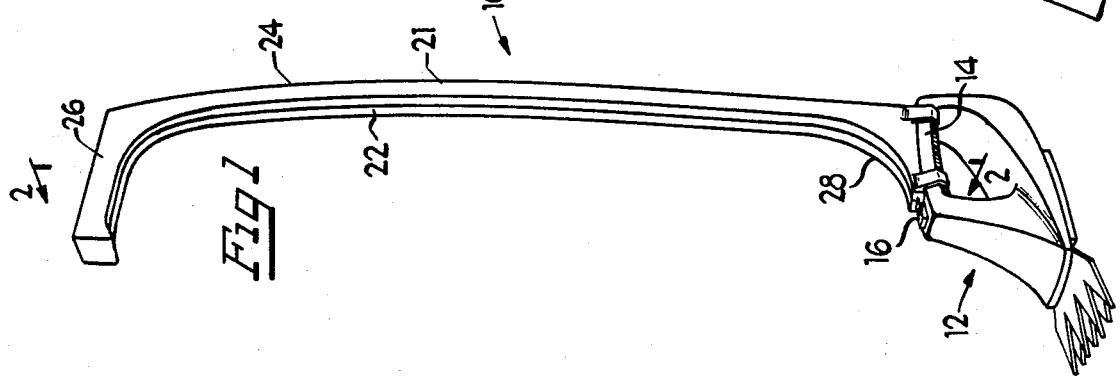

EXTENSION HANDLE FOR A HANDHELD ELECTRICALLY POWERED TOOL

BACKGROUND OF THE INVENTION

1. Field of the Invention

This invention relates generally to extension handles for handheld electrically powered tools and more particularly to an extension handle for a battery powered grass shear.

2. Background Art

Handheld battery powered grass shears have been popular gardening tools for a number of years. Generally, the user must bend, stoop or kneel while using the battery operated grass shear to trim the edges of a lawn or around obstacles. An extension handle that permits on/off control of the grass shear at the remote, user held, end of the handle facilitates use of the grass shear from an upright, standing position. U.S. Pat. No. 3,805,385 discloses a tubular extension handle seated in a receiving bore formed in the plastic molded housing halves of the grass shear. However, there remains a need for an extension handle that is adapted to fit a battery operated grass shear that does not have an extension handle receiving bore.

SUMMARY OF THE INVENTION

The present invention is concerned with providing an extension handle with a remote on/off control adapted to fit a battery operated grass shear not having an extension handle mounting bore. These and other objects and advantages of the invention are achieved by providing an elongated "C" shaped handle, the lower section of which clamps over the hand grip portion of a battery operated grass shear. Contained within the extension handle is a flexible strip, one end of which engages the on/off switch of the battery operated grass shear with the other end being manually moveable by a lever carried in the upper section of the extension handle.

BRIEF DESCRIPTION OF THE DRAWINGS

For a better understanding of the present invention reference may be had to the accompanying drawings in which:

FIG. 1 is a perspective view of an extension handle embodying the present invention attached to a grass shear;

FIG. 2 is an enlarged sectional view taken generally along line 2—2 of FIG. 1;

FIG. 3 is an enlarged sectional view taken generally along line 3—3 of FIG. 2;

FIG. 4 is an enlarged sectional view taken generally along line 4—4 of FIG. 2; and FIG. 5 is an enlarged sectional view taken generally along line 5—5 of FIG. 2.

DETAILED DESCRIPTION OF THE PREFERRED EMBODIMENT

Referring now to the drawings in which like parts are designated by like reference numerals throughout the several views, FIG. 1 shows an extension handle 10 attached to a battery operated grass shear 12 such as that disclosed in Edgell, U.S. Pat. No. 3,623,223. Forward of the hand grip portion 14, grass shear 12 has an on/off switch button 16 with serrations 17 to improve the purchase of the user's thumb on switch 16. The switch is normally biased rearwardly and must be pushed forward to turn on the grass shear. As a safety measure, the grass shear is provided with a biased, laterally slidable switch lock 18 that has an upstanding part 19 along one side. With the user's hand properly in place along hand grip portion 14, the side of the user's thumb displaces switch lock 18 to one side, thus freeing switch 16 to be pushed forwardly.

Extension handle 10 may be formed as a generally hollow, elongated "C" of molded halves 21 and 22 of a relatively rigid plastic. The length of the generally vertical section 24 of the elongated "C" is approximately thirty inches to facilitate use of the grass shear from an upright standing position. Forward of, and generally transverse to, vertical section 24 is an upper, hand grip section 26. Also forward of vertical section 24 and generally parallel to hand grip section 26, is a lower section 28 that is attachable to the grass shear hand grip portion 14. The "C" shape of the extension handle positions the grass shear more directly below the user's hand to reduce fatigue.

Lower section 28 of the extension handle is open at the bottom and, together with vertical section 24 and hand grip section 26, forms a continuous internal conduit 30. Projectng rearwardly and downwardly from the lowermost back portion of the extension handle is a flange 32 that fits the downwardly curving, upper rear corner of the grass shear hand grip portion 14. Adjacent the front and rear of each side of lower portion 28 are spaced apart pairs of clamps 34. As is best shown in FIG. 4, clamps 34 are shaped to conform to the sides of the hand grip portion of the grass shear. Clamps 34 are sufficiently resilient to permit each laterally opposed pair to be forced apart to fit over the hand grip portion 14 and then be inherently biased back toward each other to secure extension handle 10 to grass shear 12.

Extending throughout substantially the entire length of internal conduit 30 is a flexible strip of plastic 36. The lower end of strip 36 projects out through an opening 38 in a forward wall 39 of the lower section 28 and terminates in a downwardly directed tab 40. The height of opening 38 is just slightly greater than the thickness of strip 36 so as to restrain vertical movement of the strip while permitting the strip to slide in and out of internal conduit 30. Also restraining movement of strip 36 in other directions, while facilitating movement along the length of internal conduit 30, are a series of spaced apart guide posts 42 each having a slot 43 through which the flexible strip passes. Downwardly turned tab 40 engages switch 16 to push the switch forwardly against its bias to turn the grass shear on in response to outward movement of flexible strip 36. Inboard of tab 40, a cam 44 projects downwardly from flexible strip 36. Cam 44 engages the upstanding part 19 of switch lock 18 to slide the switch slot laterally in the direction of the arrow shown in FIG. 5 in response to outward movement of flexible strip 36.

At the upper end of extension handle 10, flexible strip 36 is connected to a pivot switch 46. The switch includes a lever 48 mounted for pivotal movement about a pin 50 received in integrally formed sockets 51 within hand grip section 26. Below the pivotal connection, lever 48 extends through an opening 52 in the flexible strip and is biased by a coil spring 54 towards the front of hand grip section 26. Above the pivotal connection, lever 48 extends through an opening 56 and terminates in a serrated thumb actuator 58. When the user grips section 26 and urges switch 46 forwardly by thumb pressure upon actuator 58, flexible strip 36 is pushed rearwardly along the part of internal conduit 30 lying within hand grip section 26, then downwardly along that part of the conduit formed by the vertical section 24 and finally forwardly through and out of lower attachment section 28.

While a particular embodiment of the present invention has been shown and described, variations, changes and modifications will occur to those skilled in the art. It is intended in the appended claims to cover all such variations, changes and modifications as fall within the true spirit and scope of the present invention.

What is claimed as new and desired to be secured by Letters Patent is:

1. An extension handle for an electrically powered, handheld tool having a hand grippable portion and a back to front slidable, thumb actuatable on/off switch and a laterally moveable switch lock comprising:
  a section attachable to the hand grippable portion of the tool and a spaced apart hand grippable section connected by a generally transverse section;
  means depending from the attachable section for clamping over the hand grippable portion of the tool;
  means actuatable from the hand grippable section and extending to the hand grippable portion of the tool for controlling the on/off switch on the hand grippable portion of the tool; and
  a cam carried by the control means for sliding the switch lock laterally.

2. The extension handle of claim 1 in which the clamping means permits removable attachment of the extension handle.

3. The extension handle of claim 1 in which the extension handle is generally hollow and the control means includes a member that extends through the extension handle from the hand grippable section to the attachable section.

4. The extension handle of claim 1 in which the control means includes an elongated flexible member that transmits motion from the hand grip section of the extension handle to the on/off switch of the grass shear.

5. The extension handle of claim 4 in which:
  the extension handle is generally hollow; and
  the flexible member is generally contained within the hollow extension handle.

6. The extension handle of claim 5 in which:
  there are a number of inwardly projecting guide posts within the hollow extension handle; and
  each of the guide posts has a slot through which the flexible member passes.

7. The extension handle of claim 6 in which the extension handle has a generally elongated "C" shape.

8. The extension handle of claim 1 in which the clamping means includes a pair of resilient tabs depending from the attachable section, the tabs being inherently biased toward each other.

9. The extension handle of claim 8 in which the hand grippable portion of the tool has a predetermined cross section and the tabs have inside surfaces which generally conform to the predetermined cross section.

10. The extension handle of claim 1 in which the extension handle has a generally elongated "C" shape.

11. The extension handle of claim 10 in which the control means includes an elongated flexible member that transmits motion from the hand grip section of the extension handle to the on/off switch of the grass shear.

12. The extension handle of claim 11 in which:
  the extension handle is generally hollow; and
  the flexible member is generally contained with the hollow extension handle.

* * * * *